J. W. ANDROVATT.
Chimney Cowl.

No. 201,641.　　　　Patented March 26, 1878.

WITNESSES:
C. Neveux
C. Sedgwick

INVENTOR:
J. W. Androvatt
BY
ATTORNEYS.

UNITED STATES PATENT OFFICE.

JACOB W. ANDROVATT, OF PRINCE'S BAY, NEW YORK.

IMPROVEMENT IN CHIMNEY-COWLS.

Specification forming part of Letters Patent No. 201,641, dated March 26, 1878; application filed February 15, 1878.

*To all whom it may concern:*

Figure 1:
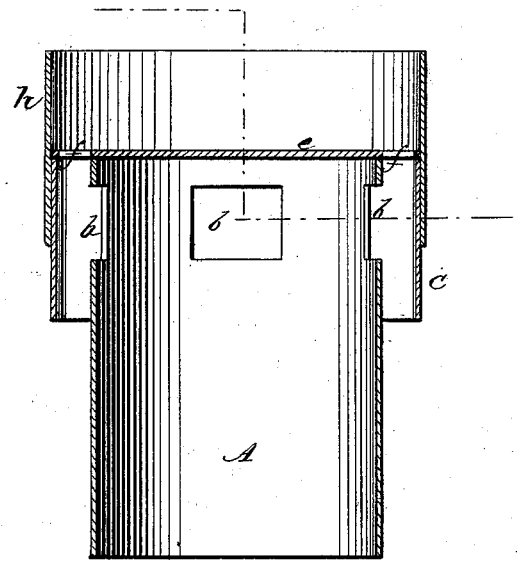
Figure 2:
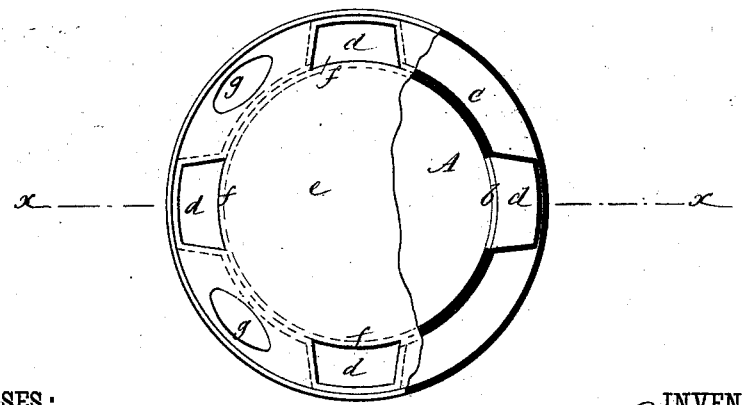

Be it known that I, JACOB W. ANDROVATT, of Prince's Bay, in the county of Richmond and State of New York, have invented a new and Improved Chimney-Cowl, of which the following is a specification:

Figure 1 is a vertical section taken on line $x\,x$ in Fig. 2. Fig. 2 is a plan view, with a portion broken away to show the construction more clearly.

Similar letters of reference indicate corresponding parts.

The object of my invention is to provide an inexpensive and effective cowl for chimneys, and for ventilating purposes.

The invention consists in a pipe closed at its upper end, and having lateral discharge-openings near the top, and surrounded by a thimble, between which and the pipe vertical passages are formed for the discharge of smoke and for the passage of wind.

In the drawing, A is a pipe, having near its upper end lateral apertures $b$. Surrounding the pipe there is a thimble, $c$, which is offset or corrugated to form the passages $d$, which communicate with the openings $b$.

Upon the top of the pipe there is a disk, $e$, which is of sufficient size to cover the thimble $c$, and has apertures $f$, which coincide with the passages $d$ and apertures $g$, between the passages $d$ and outside of the pipe. A thimble, $h$, surrounds the disk $e$ and thimble $c$, and extends a short distance above and below the disk.

Smoke finds an easy exit through the apertures $b$ and passages $d$, while the wind from any direction cannot enter the pipe, but promotes the draft by blowing through or against the cowl.

Having thus fully described my invention, I claim as new and desire to secure by Letters Patent—

A cowl consisting of the apertured pipe A, the thimble $c$, having the passages $d$, the apertured disk $e$, and thimble $h$, combined and arranged substantially as herein shown and described.

JACOB W. ANDROVATT.

Witnesses:
　C. SEDGWICK.
　GEO. M. HOPKINS.